United States Patent
Propheter-Hinckley et al.

(10) Patent No.: US 11,840,930 B2
(45) Date of Patent: Dec. 12, 2023

(54) COMPONENT WITH FEATHER SEAL SLOTS FOR A GAS TURBINE ENGINE

(71) Applicant: RTX CORPORATION, Farmington, CT (US)

(72) Inventors: Tracy A. Propheter-Hinckley, Rocky Hill, CT (US); Craig R. McGarrah, Southington, CT (US); Kyle J. Brevick, Windsor, CT (US); Egon Salimusaj, East Hartford, CT (US)

(73) Assignee: RTX CORPORATION, Farmington, CT (US)

( * ) Notice: Subject to any disclaimer, the term of this patent is extended or adjusted under 35 U.S.C. 154(b) by 923 days.

(21) Appl. No.: 16/415,865

(22) Filed: May 17, 2019

(65) Prior Publication Data

US 2020/0362715 A1    Nov. 19, 2020

(51) Int. Cl.
*F01D 11/00*    (2006.01)
*F02C 7/28*    (2006.01)

(52) U.S. Cl.
CPC ............. *F01D 11/005* (2013.01); *F02C 7/28* (2013.01); *F05D 2220/32* (2013.01); *F05D 2240/12* (2013.01); *F05D 2240/55* (2013.01)

(58) Field of Classification Search
CPC ........ F01D 11/005; F01D 11/006; F01D 9/04; F01D 9/041; F02C 7/28; F05D 2240/11
See application file for complete search history.

(56) References Cited

U.S. PATENT DOCUMENTS 5,154,577 A * 10/1992 Kellock ................ F01D 11/005
  277/641
5,709,530 A *  1/1998 Cahill .................. F01D 11/005
  277/644

(Continued)

FOREIGN PATENT DOCUMENTS

WO    2014138320 A1    9/2014

OTHER PUBLICATIONS

EP Search Report for Application No. 20175273.0; dated Sep. 18, 2020.

(Continued)

*Primary Examiner* — Courtney D Heinle
*Assistant Examiner* — Sang K Kim
(74) *Attorney, Agent, or Firm* — CANTOR COLBURN LLP (57) ABSTRACT

A vane for a gas turbine engine, the vane including: an inner diameter platform and an outer diameter platform and an airfoil that extends between the inner diameter platform and the outer diameter platform, the airfoil having a leading edge, a trailing edge, a pressure side and a suction side, the inner diameter platform has a suction side mate face and a pressure side mate face, wherein the suction side mate face and the pressure side mate face of the inner diameter platform have an axial feather seal slot and a radial seal slot, the axial feather seal slot includes a leading edge portion that extends from the radial seal slot towards a leading edge of the inner diameter platform and a trailing edge portion that extends from the radial seal slot towards a trailing edge of (Continued)

the inner diameter platform, and a chamfer extends between the radial seal slot and the trailing edge portion of the axial feather seal slot.

19 Claims, 10 Drawing Sheets

(56) References Cited

U.S. PATENT DOCUMENTS

| | | | | |
|---|---|---|---|---|
| 5,971,703 A * | 10/1999 | Bouchard | ............. | F01D 25/246 415/135 |
| 5,988,975 A | 11/1999 | Pizzi | | |
| 7,338,253 B2 * | 3/2008 | Nigmatulin | ........... | F01D 11/005 415/139 |
| 7,575,415 B2 * | 8/2009 | Drerup | ................. | F01D 11/005 29/888.3 |
| 7,784,264 B2 | 8/2010 | Weaver et al. | | |
| 8,092,163 B2 * | 1/2012 | Shapiro | .................. | F01D 9/042 415/189 |
| 8,100,644 B2 * | 1/2012 | Hazevis | ................ | F01D 11/005 415/173.1 |
| 8,794,640 B2 * | 8/2014 | Bergman | .............. | F01D 11/005 277/654 |
| 9,808,889 B2 * | 11/2017 | Mitchell | ............... | B23K 33/004 |
| 10,072,517 B2 * | 9/2018 | Boeke | ...................... | F01D 9/041 |
| 10,247,024 B2 * | 4/2019 | Dev | ....................... | F01D 11/006 |
| 10,597,334 B2 * | 3/2020 | Watanabe | ............... | F01D 9/041 |
| 10,920,600 B2 * | 2/2021 | Blaney | .................. | F01D 25/246 |
| 10,941,671 B2 * | 3/2021 | Dooley | ..................... | F01D 5/30 |
| 2009/0269188 A1 * | 10/2009 | Martin | .................. | F01D 11/005 415/173.1 |
| 2011/0236199 A1 * | 9/2011 | Bergman | .............. | F01D 11/005 415/208.1 |
| 2018/0274381 A1 * | 9/2018 | Dooley | ................ | F01D 11/006 |

OTHER PUBLICATIONS

Communication pursuant to Article 94(3) EPC dated Sep. 13, 2021; EP Application No. 20175273.0; 3 pages.

* cited by examiner

COMPONENT WITH FEATHER SEAL SLOTS FOR A GAS TURBINE ENGINE

BACKGROUND

This disclosure relates to a gas turbine engine, and more particularly to a vane that may be incorporated into a gas turbine engine.

In some vane feather seal designs the inner diameter has two sealing surfaces a horizontal portion and a vertical portion. Typically these seals are loaded toward the gas path.

However, in certain circumstances, an aft portion of the horizontal seal may be off loaded and want to seal against the non-gas path side of the feather seal slot. This may result in undesired shearing of the feather seal of the vane. Accordingly it is desirable to limit shearing forces to feather seals of a vane.

BRIEF DESCRIPTION

Disclosed is a vane for a gas turbine engine, the vane including: an inner diameter platform and an outer diameter platform and an airfoil that extends between the inner diameter platform and the outer diameter platform, the airfoil having a leading edge, a trailing edge, a pressure side and a suction side, the inner diameter platform has a suction side mate face and a pressure side mate face, wherein the suction side mate face and the pressure side mate face of the inner diameter platform have an axial feather seal slot and a radial seal slot, the axial feather seal slot includes a leading edge portion that extends from the radial seal slot towards a leading edge of the inner diameter platform and a trailing edge portion that extends from the radial seal slot towards a trailing edge of the inner diameter platform, and a chamfer extends between the radial seal slot and the trailing edge portion of the axial feather seal slot.

In addition to one or more of the features described above, or as an alternative to any of the foregoing embodiments, a first feather seal and a second feather seal are located in the axial feather seal slot and the radial seal slot.

In addition to one or more of the features described above, or as an alternative to any of the foregoing embodiments, the first feather seal includes a horizontal portion that is located in the leading edge portion of the axial feather seal slot and a vertical portion that is located in the radial seal slot when the first feather seal is located in the axial feather seal slot and the radial seal slot.

In addition to one or more of the features described above, or as an alternative to any of the foregoing embodiments, the second feather seal includes a horizontal portion that is located in the trailing edge portion of the axial feather seal slot and a vertical portion that is located in the radial seal slot when the second feather seal is located in the axial feather seal slot and the radial seal slot.

In addition to one or more of the features described above, or as an alternative to any of the foregoing embodiments, the second feather seal includes a horizontal portion that is located in the trailing edge portion of the axial feather seal slot and a vertical portion that is located in the radial seal slot when the second feather seal is located in the axial feather seal slot and the radial seal slot.

In addition to one or more of the features described above, or as an alternative to any of the foregoing embodiments, the leading edge portion and the trailing edge portion of the axial feather seal slot has a gas path side and a non-gas path side and the gas path side is closer to an exterior surface of the inner diameter platform than the non-gas path side.

In addition to one or more of the features described above, or as an alternative to any of the foregoing embodiments, the leading edge portion and the trailing edge portion of the axial feather seal slot has a gas path side and a non-gas path side and the gas path side is closer to an exterior surface of the inner diameter platform than the non-gas path side.

In addition to one or more of the features described above, or as an alternative to any of the foregoing embodiments, the horizontal portion of the second feather seal is loaded against the non-gas path side of the trailing edge portion a bend portion connects the horizontal portion and the vertical portion of the second feather seal.

In addition to one or more of the features described above, or as an alternative to any of the foregoing embodiments, the bend portion does not make contact with the chamfer when the horizontal portion of the second feather seal is loaded against the non-gas path side of the trailing edge portion.

In addition to one or more of the features described above, or as an alternative to any of the foregoing embodiments, the chamfer and the second feather seal are configured such that the bend portion does not make contact with edges of the chamfer.

In addition to one or more of the features described above, or as an alternative to any of the foregoing embodiments, the chamfer is formed using electric discharge machining.

Also disclosed is vane assembly for a gas turbine engine, the vane assembly including: a first vane comprising an inner diameter platform and an outer diameter platform and an airfoil that extends between the inner diameter platform and the outer diameter platform, the airfoil having a leading edge, a trailing edge, a pressure side and a suction side, the inner diameter platform has a suction side mate face and a pressure side mate face, wherein the suction side mate face and the pressure side mate face of the inner diameter platform have an axial feather seal slot and a radial seal slot, the axial feather seal slot includes a leading edge portion that extends from the radial seal slot towards a leading edge of the inner diameter platform and a trailing edge portion that extends from the radial seal slot towards a trailing edge of the inner diameter platform, and a chamfer extends between the radial seal slot and the trailing edge portion of the axial feather seal slot; and a second vane comprising an inner diameter platform and an outer diameter platform and an airfoil that extends between the inner diameter platform and the outer diameter platform, the airfoil having a leading edge, a trailing edge, a pressure side and a suction side, the inner diameter platform has a suction side mate face and a pressure side mate face, wherein the suction side mate face and the pressure side mate face of the inner diameter platform have an axial feather seal slot and a radial seal slot, the axial feather seal slot includes a leading edge portion that extends from the radial seal slot towards a leading edge of the inner diameter platform and a trailing edge portion that extends from the radial seal slot towards a trailing edge of the inner diameter platform, and a chamfer extends between the radial seal slot and the trailing edge portion of the axial feather seal slot; wherein when the first vane and the second vane are adjacent to each other the axial feather seal slot and the radial seal slot of the inner diameter platform of the first vane and the second vane are adjacent to each other such that a first feather seal and a second feather seal can be located in the axial feather seal slot and the radial seal slot of the inner diameter platform of the first vane and the second vane.

In addition to one or more of the features described above, or as an alternative to any of the foregoing embodiments, the first feather seal includes a horizontal portion that is located in the leading edge portion of the axial feather seal slot and a vertical portion that is located in the radial seal slot when the first feather seal is located in the axial feather seal slot and the radial seal slot of the first vane and the second vane.

In addition to one or more of the features described above, or as an alternative to any of the foregoing embodiments, the second feather seal includes a horizontal portion that is located in the trailing edge portion of the axial feather seal slot and a vertical portion that is located in the radial seal slot when the second feather seal is located in the axial feather seal slot and the radial seal slot of the first vane and the second vane.

In addition to one or more of the features described above, or as an alternative to any of the foregoing embodiments, the second feather seal includes a horizontal portion that is located in the trailing edge portion of the axial feather seal slot and a vertical portion that is located in the radial seal slot when the second feather seal is located in the axial feather seal slot and the radial seal slot of the first vane and the second vane.

In addition to one or more of the features described above, or as an alternative to any of the foregoing embodiments, the leading edge portion and the trailing edge portion of the axial feather seal slot of the first vane and the second vane has a gas path side and a non-gas path side and the gas path side is closer to an exterior surface of the inner diameter platform of the first vane and the second vane than the non-gas path side.

In addition to one or more of the features described above, or as an alternative to any of the foregoing embodiments, the leading edge portion and the trailing edge portion of the axial feather seal slot of the first vane and the second vane has a gas path side and a non-gas path side and the gas path side is closer to an exterior surface of the inner diameter platform of the first vane and the second vane than the non-gas path side.

In addition to one or more of the features described above, or as an alternative to any of the foregoing embodiments, the horizontal portion of the second feather seal is loaded against the non-gas path side of the trailing edge portion of the first vane and/or the second vane a bend portion connects the horizontal portion and the vertical portion of the second feather seal.

In addition to one or more of the features described above, or as an alternative to any of the foregoing embodiments, the bend portion does not make contact with the chamfer of the first vane or the second vane when the horizontal portion of the second feather seal is loaded against the non-gas path side of the trailing edge portion of the first vane or the second vane.

In addition to one or more of the features described above, or as an alternative to any of the foregoing embodiments, the chamfer and the second feather seal are configured such that the bend portion does not make contact with the edges of the chamfer of the first vane or the second vane.

Also disclosed is a vane for a gas turbine engine, the vane including: an inner diameter platform and an outer diameter platform and an airfoil that extends between the inner diameter platform and the outer diameter platform, the airfoil having a leading edge, a trailing edge, a pressure side and a suction side, the inner diameter platform and the outer diameter platform each have a suction side mate face and a pressure side mate face, wherein the suction side mate face and the pressure side mate face of the inner diameter platform and the outer diameter platform have an axial feather seal slot and a radial seal slot, wherein the axial feather seal slot of the suction side mate face and the pressure side mate face of at least one of the inner diameter platform and the outer diameter platform includes a leading edge portion that extends from the radial seal slot towards a leading edge of the inner diameter platform and/or a leading edge of the outer diameter platform and a trailing edge portion that extends from the radial seal slot towards a trailing edge of the inner diameter platform and/or a trailing edge of the outer diameter platform, and a chamfer extends between the radial seal slot and the trailing edge portion of the axial feather seal slot.

A component for a gas turbine engine, the component including: an axial feather seal slot and a radial seal slot located on opposing faces of the component, the axial feather seal slot includes a leading edge portion that extends from the radial seal slot towards a leading edge of the component and a trailing edge portion that extends from the radial seal slot towards a trailing edge of the component, and a chamfer extends between the radial seal slot and the trailing edge portion of the axial feather seal slot.

In addition to one or more of the features described above, or as an alternative to any of the foregoing embodiments, the component is a vane of the gas turbine engine.

In addition to one or more of the features described above, or as an alternative to any of the foregoing embodiments, the component is a blade outer air seal of the gas turbine engine.

In addition to one or more of the features described above, or as an alternative to any of the foregoing embodiments, the chamfer is formed using electric discharge machining.

In addition to one or more of the features described above, or as an alternative to any of the foregoing embodiments, the component is a vane, the vane having an inner diameter platform and an outer diameter platform and an airfoil that extends between the inner diameter platform and the outer diameter platform, the airfoil having a leading edge, a trailing edge, a pressure side and a suction side, and wherein the opposing faces of the component are a suction side mate face and a pressure side mate face of the inner diameter platform, wherein the suction side mate face and the pressure side mate face of the inner diameter platform each have a first feather seal and a second feather seal located in the axial feather seal slot and the radial seal slot.

In addition to one or more of the features described above, or as an alternative to any of the foregoing embodiments, the first feather seal includes a horizontal portion that is located in the leading edge portion of the axial feather seal slot and a vertical portion that is located in the radial seal slot when the first feather seal is located in the axial feather seal slot and the radial seal slot.

In addition to one or more of the features described above, or as an alternative to any of the foregoing embodiments, the second feather seal includes a horizontal portion that is located in the trailing edge portion of the axial feather seal slot and a vertical portion that is located in the radial seal slot when the second feather seal is located in the axial feather seal slot and the radial seal slot.

In addition to one or more of the features described above, or as an alternative to any of the foregoing embodiments, the second feather seal includes a horizontal portion that is located in the trailing edge portion of the axial feather seal slot and a vertical portion that is located in the radial seal slot when the second feather seal is located in the axial feather seal slot and the radial seal slot.

In addition to one or more of the features described above, or as an alternative to any of the foregoing embodiments, the leading edge portion and the trailing edge portion of the axial feather seal slot are only located in the inner diameter platform and the leading edge portion and the trailing edge portion of the axial feather seal slot has a gas path side and a non-gas path side and the gas path side is closer to an exterior surface of the inner diameter platform than the non-gas path side.

In addition to one or more of the features described above, or as an alternative to any of the foregoing embodiments, the leading edge portion and the trailing edge portion of the axial feather seal slot has a gas path side and a non-gas path side and the gas path side is closer to an exterior surface of the inner diameter platform than the non-gas path side.

In addition to one or more of the features described above, or as an alternative to any of the foregoing embodiments, the horizontal portion of the second feather seal is loaded against the non-gas path side of the trailing edge portion a bend portion connects the horizontal portion and the vertical portion of the second feather seal.

In addition to one or more of the features described above, or as an alternative to any of the foregoing embodiments, the bend portion does not make contact with the chamfer when the horizontal portion of the second feather seal is loaded against the non-gas path side of the trailing edge portion.

In addition to one or more of the features described above, or as an alternative to any of the foregoing embodiments, the chamfer and the second feather seal are configured such that the bend portion does not make contact with the edges of the chamfer.

In addition to one or more of the features described above, or as an alternative to any of the foregoing embodiments, the chamfer is formed using electric discharge machining and the component is a blade outer air seal.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the FIGS.

Figure 1:
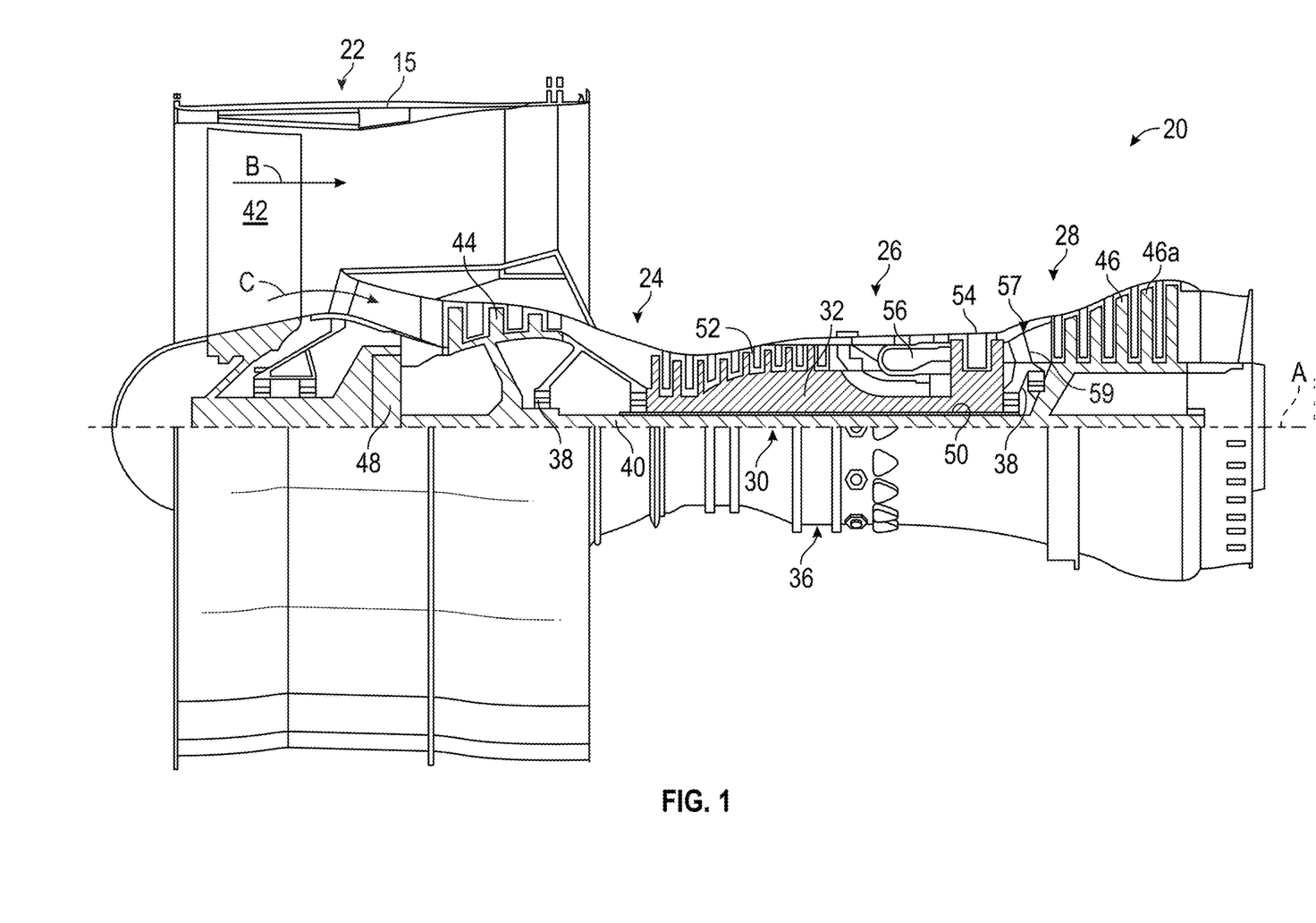
FIG. 1 is a schematic, partial cross-sectional view of a gas turbine engine in accordance with this disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first or low pressure compressor 44 and a first or low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second or high pressure compressor 52 and a second or high pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second (350.5 m/sec).

In one non-limiting example, the fan 42 includes less than about 26 fan blades. In another non-limiting embodiment, the fan 42 includes less than about 20 fan blades. Moreover, in one further embodiment the low pressure turbine 46 includes no more than about 6 turbine rotors schematically indicated at 46a. In a further non-limiting example the low pressure turbine 46 includes about 3 turbine rotors. A ratio between the number of blades of the fan 42 and the number of low pressure turbine rotors 46a is between about 3.3 and about 8.6. The example low pressure turbine 46 provides the driving power to rotate the fan section 22 and therefore the relationship between the number of turbine rotors 46a in the low pressure turbine 46 and the number of blades in the fan section 22 discloses an example gas turbine engine 20 with increased power transfer efficiency.

Figure 2:
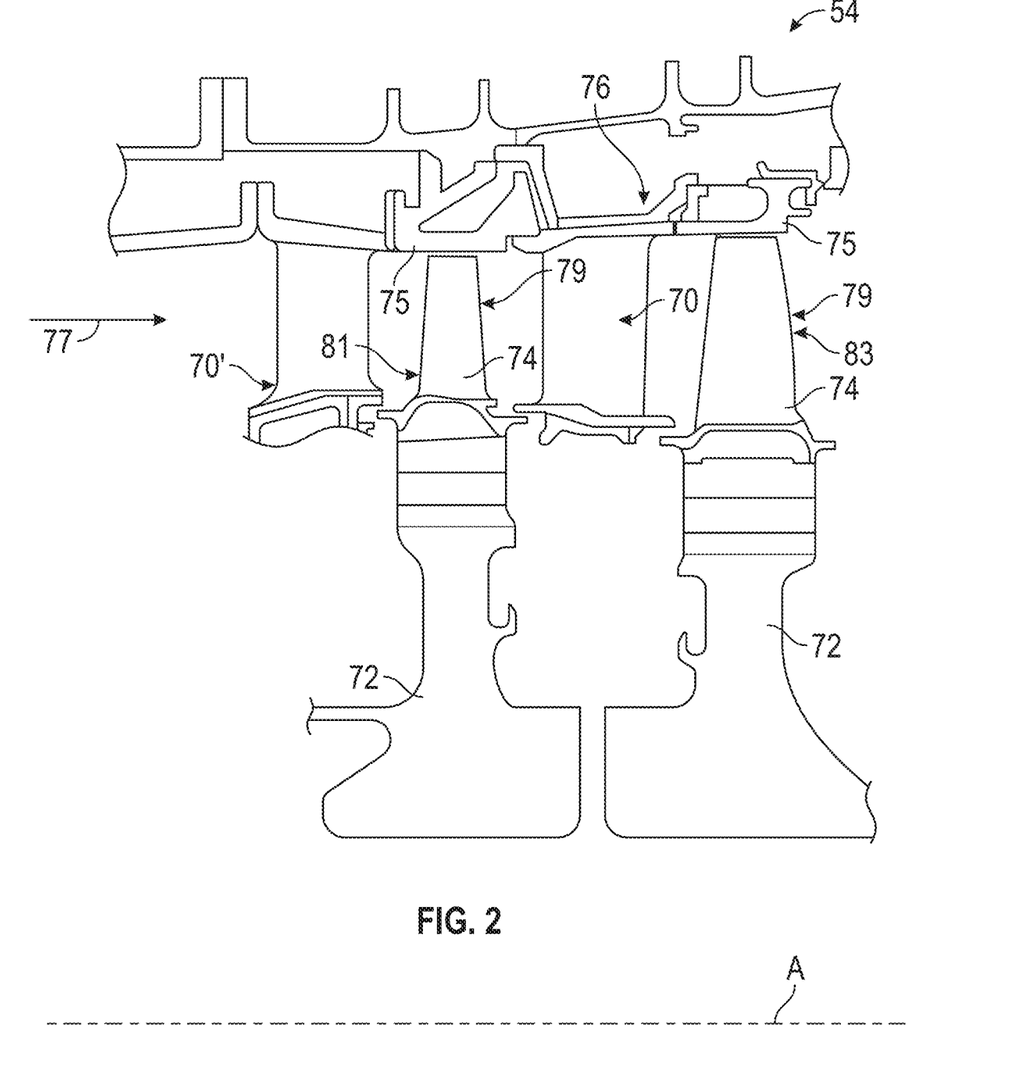
FIG. 2 is a schematic view of a two-stage high pressure turbine of the gas turbine engine.

FIG. 2 illustrates a portion of the high pressure turbine (HPT) 54. FIG. 2 also illustrates a high pressure turbine stage vanes 70 one of which (e.g., a first stage vane 70') is located forward of a first one of a pair of turbine disks 72 each having a plurality of turbine blades 74 secured thereto. The turbine blades 74 rotate proximate to blade outer air seals (BOAS) 75 which are located aft of the vane 70 or first stage vane 70'. The other vane 70 is located between the pair of turbine disks 72. This vane 70 may be referred to as the second stage vane. As used herein the first stage vane 70' is the first vane of the high pressure turbine section 54 that is located aft of the combustor section 26 and the second stage vane 70 is located aft of the first stage vane 70' and is located between the pair of turbine disks 72. In addition, blade outer air seals (BOAS) 75 are disposed between the first stage vane 70' and the second stage vane 70. The high pressure turbine stage vane 70 (e.g., second stage vane) or first stage vane 70' is one of a plurality of vanes 70 that are positioned circumferentially about the axis A of the engine in order to provide a stator assembly 76. Hot gases from the combustor section 26 flow through the turbine in the direction of arrow 77. Although a two-stage high pressure turbine is illustrated other high pressure turbines are considered to be within the scope of various embodiments of the present disclosure.

Figure 3:
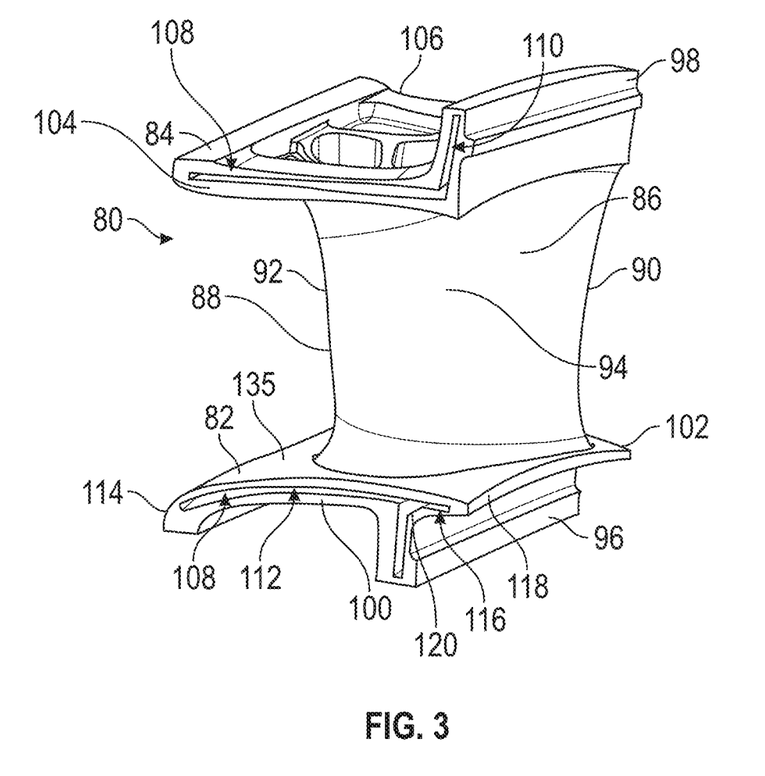
FIG. 3 is a perspective view of a vane for a gas turbine engine in accordance with this disclosure.

FIG. 3 illustrates a vane 80 which may be used as the aforementioned first stage vane 70' or the second stage vane 70 illustrated in FIG. 2. Although the vane 80 in one embodiment is described as being located in the turbine section 28 of the engine 20 the vane 80 may located in any other suitable location of the engine 20 such as but not limited to the compressor section 26 of the engine 20.

Vane 80 has an inner diameter platform 82 and an outer diameter platform 84. When the vane 80 is secured to the engine 20, the inner diameter platform 82 is closer to the longitudinal axis A than the outer diameter platform 84. In other words and when the vane 80 is secured to the engine 20, the outer diameter platform is radially outward from the inner diameter platform 82. The inner diameter platform 82 is connected to the outer diameter platform by an airfoil 86 that extends between inner diameter platform 82 and outer diameter platform 84. The airfoil 86 has a leading edge 88 and a trailing edge 90 as well as a pressure side 92 and a suction side 94.

In addition, the inner diameter platform 82 has an inner diameter trailing edge rail 96 while the outer diameter platform 84 has an outer diameter trailing edge rail 98. The inner diameter platform 82 also has a suction side mate face 100 and a pressure side mate face 102 while the outer diameter platform 84 has a suction side mate face 104 and a pressure side mate face 106. Each of the suction side mate face 100, 104 and the pressure side mate face 102, 106 of the inner diameter platform 82 and the outer diameter platform 84 have an axial feather seal slot 108 and a radial seal slot 110. In one embodiment, the axial feather seal slot 108 of the inner diameter platform 82 includes a leading edge portion 112 that extends from the radial seal slot 110 towards a leading edge 114 of the inner diameter platform 82 and the axial feather seal slot 108 of the inner diameter platform 82 includes a trailing edge portion 116 that extends from the radial seal slot 110 towards a trailing edge 118 of the inner diameter platform 82.

In addition and in accordance with an embodiment of the present disclosure, a chamfer 120 extends between the radial seal slot 110 and the trailing edge portion 116 of the axial feather seal slot 108.

Although FIG. 3 illustrates that the leading edge portion 112, the trailing edge portion 116 and the chamfer 120 are located only in the inner diameter platform 82 it is understood that in an alternative embodiment, a leading edge portion 112, a trailing edge portion 116 and a chamfer 120, as described above, may also be located in the outer diameter platform 84 in addition to the inner diameter platform 82 (See FIG. 3B) or alternatively, a leading edge portion 112, a trailing edge portion 116 and a chamfer 120 may only be located in the outer diameter platform 84. Thus, various embodiments of the present disclosure contemplate a leading edge portion 112, a trailing edge portion 116 and a chamfer 120 only in the inner diameter platforms 82 or only in the outer diameter platforms 84 or both the inner diameter platforms 82 and the outer diameter platforms 84.

Figure 3A:
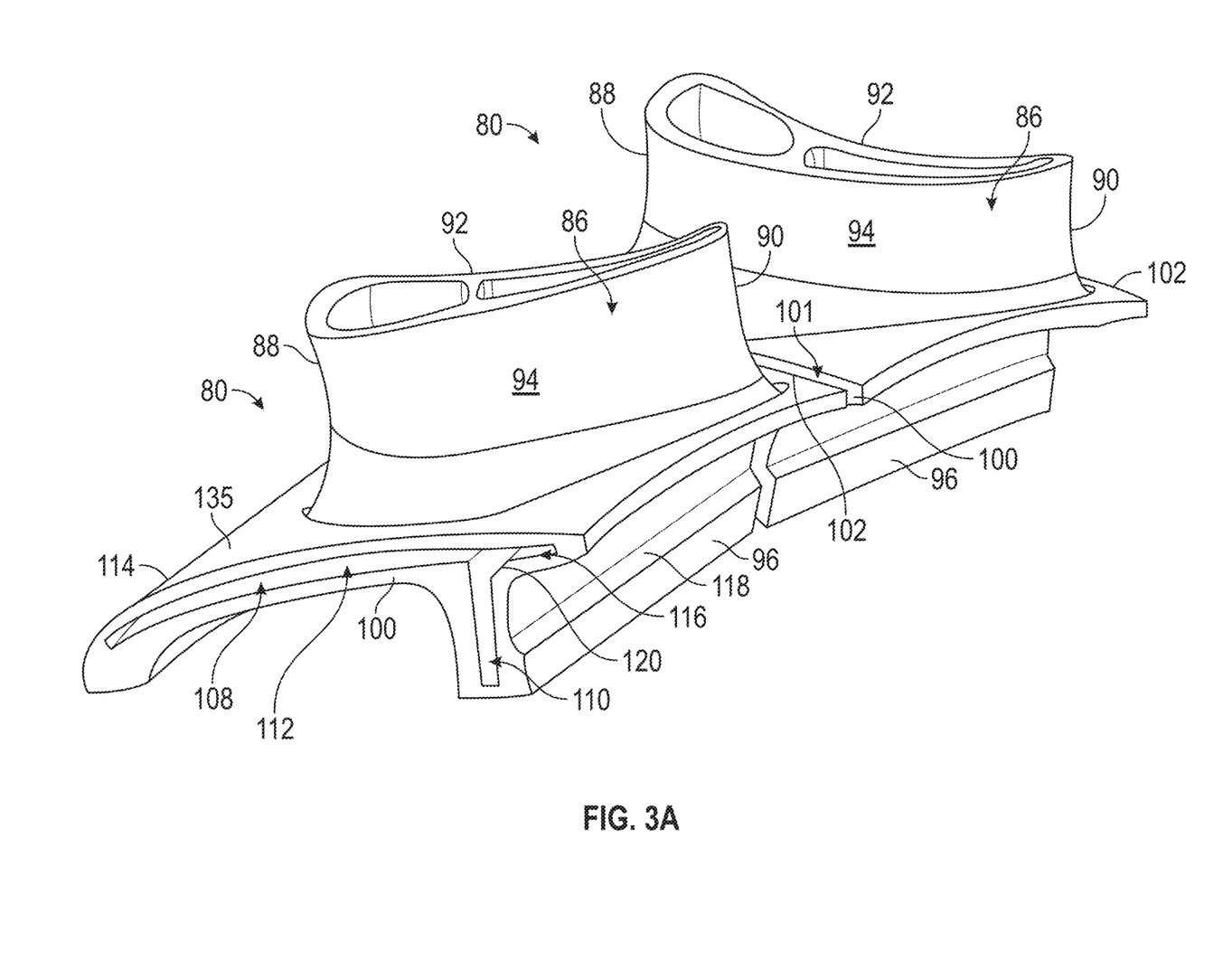
FIG. 3A is a perspective cross-sectional view of two vanes adjacent to each other in accordance with this disclosure.
Figure 3B:
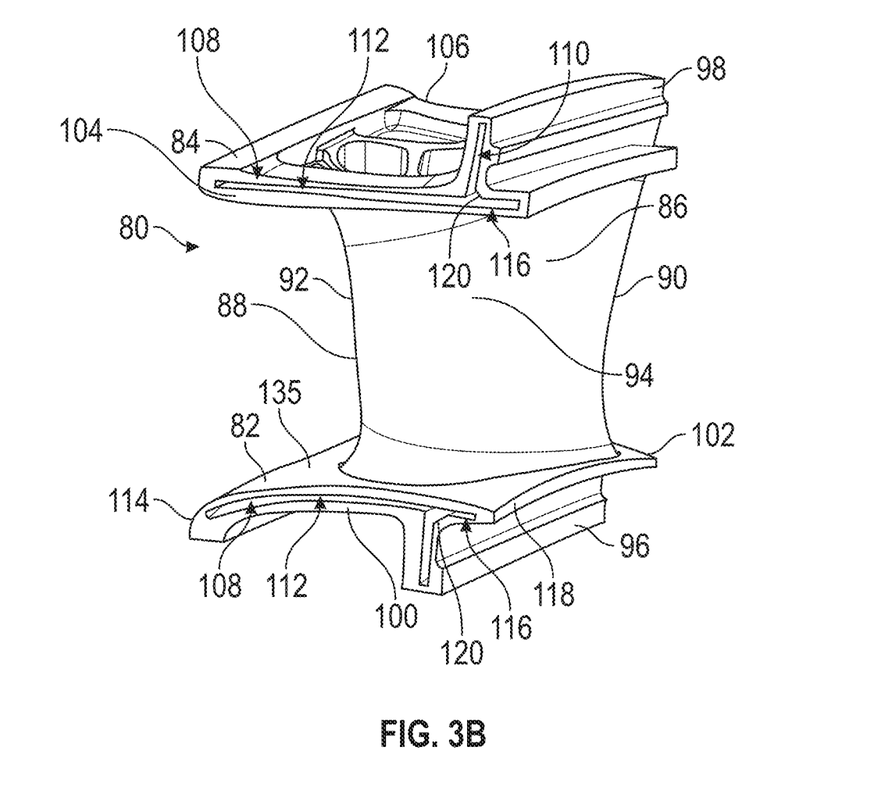
FIG. 3B is a perspective view of another vane for a gas turbine engine in accordance with this disclosure.
Figure 4:
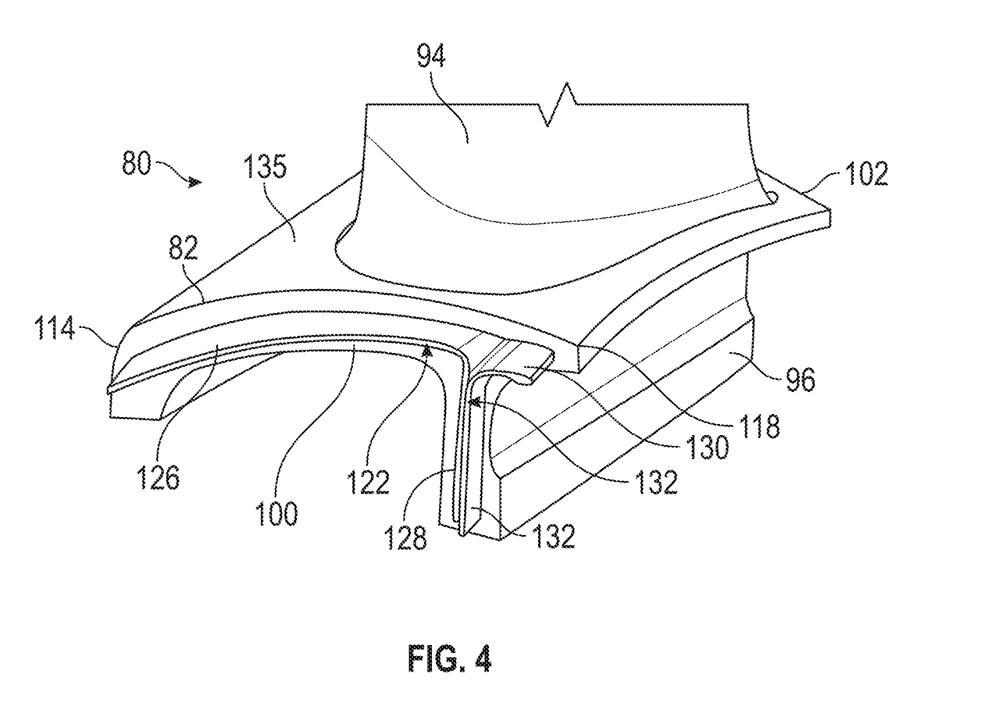
FIG. 4 is a perspective view of a portion of a vane for a gas turbine engine having feather seals located therein in accordance with this disclosure.

Referring now to FIG. 4, a first feather seal 122 and a second feather seal 124 is located in the axial feather seal slot 108 and the radial seal slot 110. It being understood that when two vanes 80 are secured next to each other the suction side mate face 100 of one vane 80 is adjacent to a pressure side mate face 102 of the adjoining vane 80 such that the axial feather seal slot 108 and the radial feather seal slot 110 of the suction side mate face 100 of the one vane 80 is adjacent to the axial feather seal slot 108 and the radial feather seal slot 110 of the pressure side mate face 102 of the adjoining vane 80 so that the first feather seal 122 and the second feather seal 124 is located in the axial feather seal slot 108 and the radial seal slot 110 of the adjoining suction side mate face 100 and the pressure side mate face 102. See for example, FIGS. 3A, 4D and 4E. In FIG. 3A two vanes 80 (partial cross-sectional view provided) are illustrated adjacent to each other. As illustrated a mate face gap 101 is located between the pressure side mate face 102 and the suction side mate face 100 of the adjoining vanes 80. This mate face gap 101 can be sealed with feather seals 122, 124 without incurring shearing, vibratory, or sealing issues/complications.

The first feather seal 122 includes a horizontal portion 126 that is located in the leading edge portion 112 of the axial feather seal slot 108 and a vertical portion 128 that is located in the radial seal slot 110 when the first feather seal 122 is located in the axial feather seal slot 108 and the radial seal slot 110. The second feather seal 124 includes a horizontal portion 130 that is located in the trailing edge portion 116 of the axial feather seal slot 108 and a vertical portion 132 that is located in the radial seal slot 110 when the second feather seal 124 is located in the axial feather seal slot 108 and the radial seal slot 110.

Referring now to at least FIGS. 3, 4A, 4B, 4D and 4E, the leading edge portion 112 and the trailing edge portion 116 of the axial feather seal slot 108 has a gas path side 134 and a non-gas path side 136. As used herein, gas path side 134 is closer to an exterior surface 135 of the platform 82 than the non-gas path side 136. Exterior surface 135 is the surface gas passing by the vane 80 interacts with.

Figure 4A:
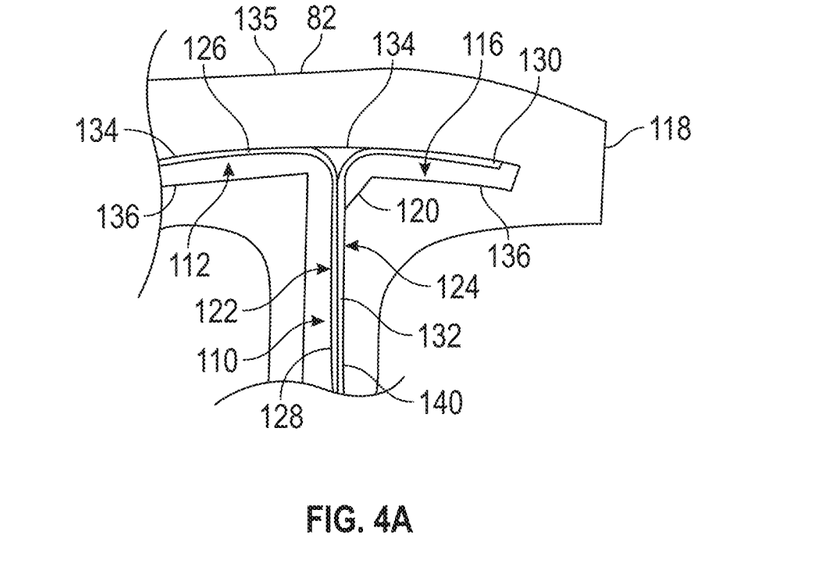
FIGS. 4A and 4B are an enlarged perspective views of a portion of a vane for a gas turbine engine having feather seals in various loading conditions in accordance with this disclosure.
Figure 4B:
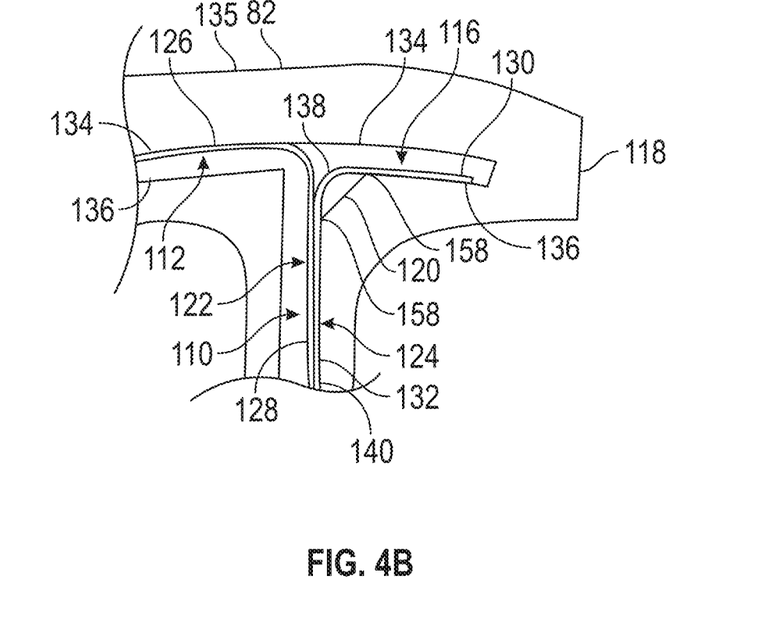

In FIG. 4A, the horizontal portion 126 of the first feather seal 122 and the horizontal portion 130 of the second feather seal 124 are loaded against the gas path side 134 of the leading edge portion 112 and the trailing edge portion 116 of the axial feather seal slot 108. In FIG. 4B, the horizontal portion 126 of the first feather seal 122 is loaded against the gas path side 134 of the leading edge portion 112 of the axial feather seal slot 108 and the horizontal portion 130 of the second feather seal 124 is loaded against the non-gas path side 136 of the trailing edge portion 116. When this occurs, a bend portion 138 connects the horizontal portion 130 and the vertical portion 132 of the second feather seal 124. By incorporating a chamfer 120 between the non-gas path side 136 of the trailing edge portion 116 and a trailing edge surface 140 of the radial seal slot 110 the bend portion 138 does not make contact with the chamfer 120.

Figure 4C:
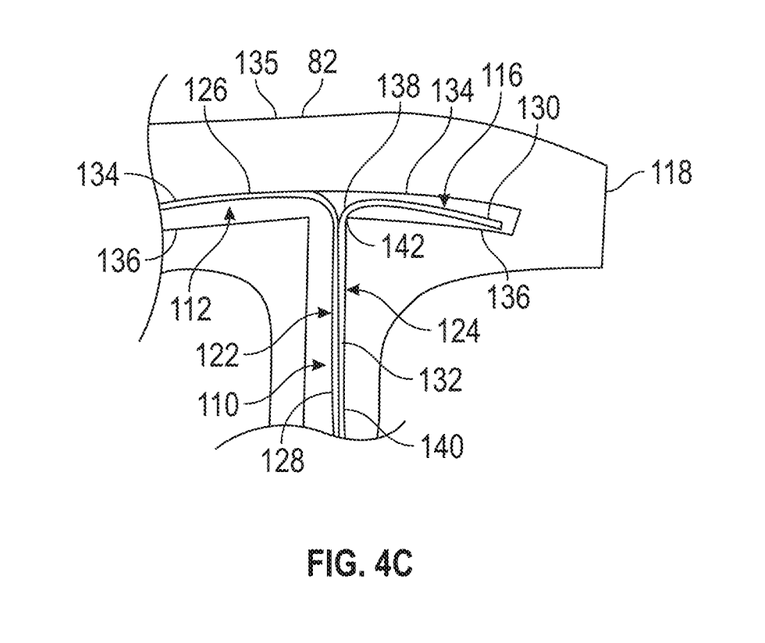
FIG. 4C is an enlarged perspective view of a portion of a vane for a gas turbine engine illustrating a feather seals making contact with an edge between the interface of an axial and a radial seal slot of the vane.

In contrast and as illustrated in FIG. 4C, there is no chamfer between the non-gas path side 136 of the trailing edge portion 116 and a trailing edge surface 140 of the radial seal slot 110. Instead there is a sharp corner 142. When this type of loading occurs (FIG. 4C) and there is no chamfer the sharp corner 142 may cause the bend portion 138 of the feather seal 124 to shear. As such, the configuration illustrated in at least FIGS. 3 and 4A, 4B, 4D and 4E prevents shearing of the feather seal 124 when the type of loading illustrated in FIGS. 4B and 4E occurs.

Figure 4D:
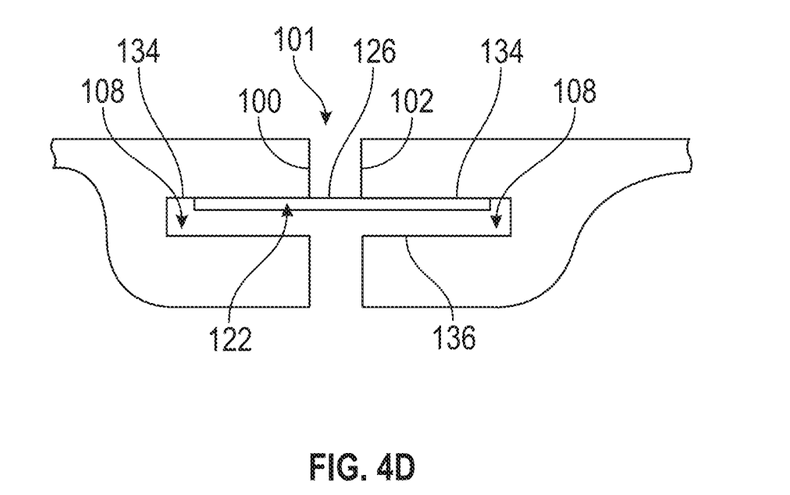
FIGS. 4D and 4E are partial cross-sectional views illustrating portions of the feather seals in radial slots of adjacent vanes in accordance with this disclosure.
Figure 4E:
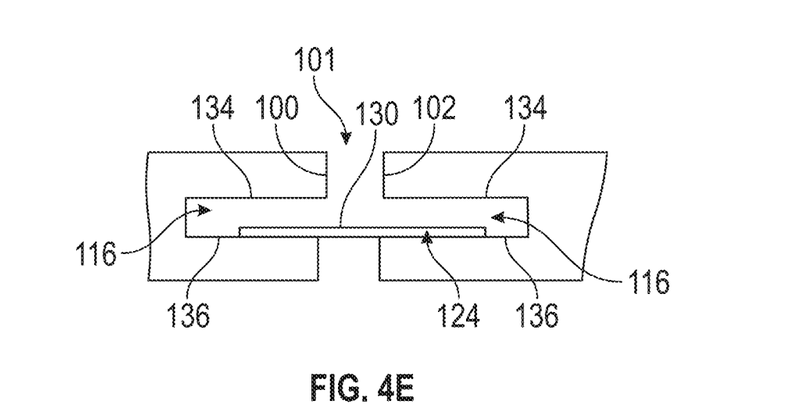

As such, chamfer 120 allows the feather seal 124 to conform to the inner (non-gas path side) 136 or outer portion (gas path side) 134 of the trailing edge portion 116 of the axial feather seal slot 108 in conjunction with the pressures in its surrounding environment. FIGS. 4D and 4E are partial are partial cross-sectional views illustrating the mate face gap 101 between the pressure side mate face 102 and the suction side mate face 100 of the adjoining vanes 80, wherein the horizontal portion 126 of the first feather seal 122 is loaded against the gas path side 134 of the leading edge portion 112 of the axial feather seal slot 108 and the horizontal portion 130 of the second feather seal 124 is loaded against the non-gas path side 136 of the trailing edge portion 116.

For example, should the pressure above a gas path passing by the vane 80 dip below the pressure below the gas path, at the trailing edge of the vane 80, the feather seal should be able to shift sealing surfaces (e.g., non-gas path side 136 and gas path side 134) without issues namely shearing on a sharp corner between the horizontal and vertical seal slots.

Figure 5:
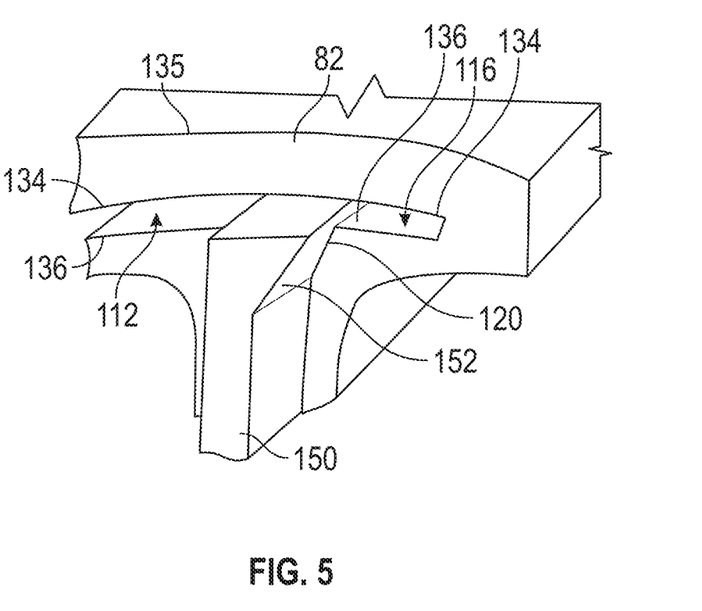
FIG. 5 is an enlarged perspective view of a portion of a vane for a gas turbine engine illustrating an electrode forming a chamfer between an axial and a radial seal slot of the vane in accordance with this disclosure.

In one non-limiting embodiment, the chamfer 120 is formed using electric discharge machining. Referring now to FIG. 5 an electric discharge machining electrode 150 is illustrated. The electric discharge machining electrode 150 has a chamfered surface 152 for forming chamfer 120.

Figure 6:
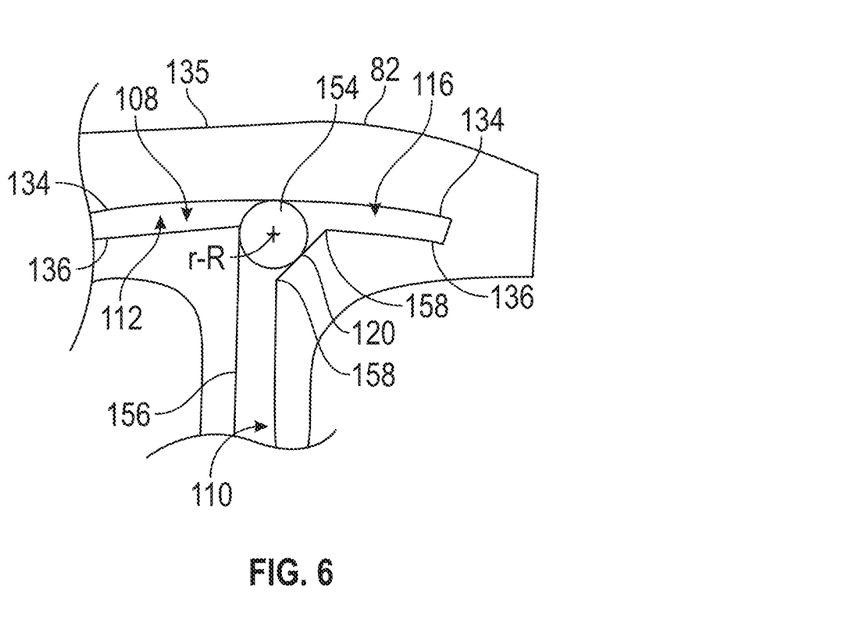
FIG. 6 is an enlarged perspective view of a portion of a vane for a gas turbine engine illustrating a pin gauge for measuring a chamfer between an axial and a radial seal slot of the vane in accordance with this disclosure.

In FIG. 6 and in order to determine when the correct chamfer 120 is formed by electrode 150 a pin gauge 154 may be used to determine the size of chamfer 120. In FIG. 6 the pin gauge 154 is illustrated in the radial seal slot 110 and the trailing edge portion 116 of the axial seal slot 108. In order to determine whether the chamfer 120 is formed with the desired configuration, the pin gauge 154 with the desired radius (e.g., a min radius r or a max radius R) is inserted into the radial slot 110 and the axial slot 108 an as long as the exterior surface of the pin gauge makes contact with the gas path side 134 of the axial slot and the chamfer 120 as well as a leading edge side 156 of the radial slot 110.

In one embodiment of the present disclosure, a chamfer 120 is formed between the trailing edge portion 116 of the radial seal slot 110 via electric discharge machining The chamfer 120 is sized such that the bend 138 of the second feather seal 124 does not interfere with the edges 158 of the chamfer 120. In addition, the chamfer 120 and its surrounding surfaces are designed such that the intent of the chamfer 120, namely to eliminate the shearing edge between the trailing edge portion 116 of the radial seal slot 110 and the radial seal slot 110, can be inspected with a simple pin gage 154.

As such, this allows the mate face gap between two vanes 80 can be sealed with feather seals 122, 124 to seal without incurring shearing, vibratory, or sealing issues/complications.

Figure 7:
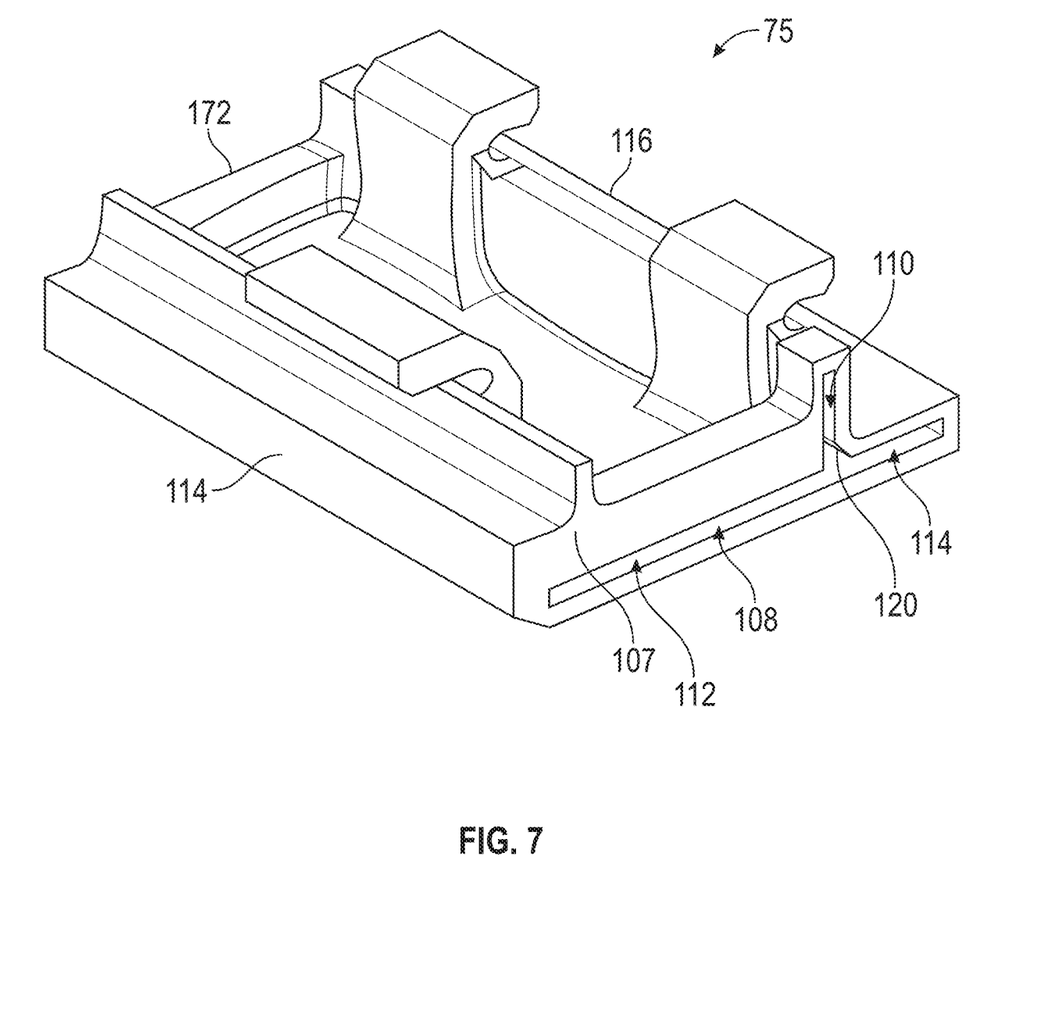
FIG. 7 is a perspective view of a blade outer air seal (BOAS) in accordance with this disclosure.

In yet another embodiment and referring now to at least FIGS. 1, 2 and 7, a blade outer air seal (BOAS) 75 is illustrated. In one embodiment, the blade outer air seal (BOAS) 75 is illustrated as being located in the turbine section 28 of the engine. Alternatively, the BOAS 75 may located in any other suitable location of the engine 20 such as but not limited to the compressor section 26 of the engine 20.

As illustrated, the BOAS 75 similar to the vane 80 has an axial feather seal slot 108 and a radial feather seal slot 110 located on opposite mate faces 170 and 172 of the BOAS 75. The axial feather seal slot 108 including a leading edge portion 112 that extends from the radial seal slot 110 towards a leading edge 114 of the BOAS 75 and a trailing edge portion 116 that extends from the radial seal slot 110 towards a trailing edge 118 of the BOAS 75. In addition, a chamfer 120 extends between the radial seal slot 110 and the trailing edge portion 116 of the axial feather seal slot 108.

As such and when two BOAS 75 are secured next to each other the mate face 170 of one BOAS 75 is adjacent to the mate face 172 of another BOAS 75 such that the axial feather seal slot 108 and the radial feather seal slot 110 of the mate face 170 of the one BOAS 75 is adjacent to the axial feather seal slot 108 and the radial feather seal slot 110 of the mate face 172 of the another BOAS 75 so that the first feather seal 122 and the second feather seal 124 are located in the aforementioned axial feather seal slots 108 and the radial seal slots 110 of the adjoining mate faces 170 and 172 such that a mate face gap between adjoining mate faces 170 and 172 can be sealed with feather seals 122, 124 without incurring shearing, vibratory, or sealing issues/complications.

Therefore and in accordance with various embodiments of the present disclosure, a component 200 (e.g., BOAS 75 or vane 80) of the gas turbine engine 20 is configured to have has an axial feather seal slot 108 and a radial feather seal slot 110 located on opposing faces of the component. The axial feather seal slot 108 including a leading edge portion 112 that extends from the radial seal slot 110 towards a leading edge 114 of the BOAS 75 and a trailing edge portion 116 that extends from the radial seal slot 110 towards a trailing edge 118 of the BOAS 75. In addition, a chamfer 120 extends between the radial seal slot 110 and the trailing edge portion 116 of the axial feather seal slot 108.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A vane for a gas turbine engine, the vane including:
an inner diameter platform and an outer diameter platform and an airfoil that extends between the inner diameter platform and the outer diameter platform, the airfoil having a leading edge, a trailing edge, a pressure side and a suction side;
an axial feather seal slot and a radial seal slot located on a suction side mate face and a pressure side mate face of the inner diameter platform, the axial feather seal slot includes a leading edge portion that extends from the radial seal slot towards a leading edge of the vane and a trailing edge portion that extends from the radial seal slot towards a trailing edge of the vane, and a chamfer extends between the radial seal slot and the trailing edge portion of the axial feather seal slot, wherein the suction side mate face and the pressure side mate face of the inner diameter platform each have a first feather seal and a second feather seal located in the axial feather seal slot and the radial seal slot.

2. The vane according to claim 1, wherein the first feather seal includes a horizontal portion that is located in the leading edge portion of the axial feather seal slot and a vertical portion that is located in the radial seal slot when the first feather seal is located in the axial feather seal slot and the radial seal slot.

3. The vane according to claim 2, wherein the second feather seal includes a horizontal portion that is located in the trailing edge portion of the axial feather seal slot and a vertical portion that is located in the radial seal slot when the second feather seal is located in the axial feather seal slot and the radial seal slot.

4. The vane according to claim 1, wherein the second feather seal includes a horizontal portion that is located in the trailing edge portion of the axial feather seal slot and a vertical portion that is located in the radial seal slot when the second feather seal is located in the axial feather seal slot and the radial seal slot.

5. The vane according to claim 1, wherein the leading edge portion and the trailing edge portion of the axial feather seal slot are only located in the inner diameter platform and the leading edge portion and the trailing edge portion of the axial feather seal slot has a gas path side and a non-gas path side and the gas path side is closer to an exterior surface of the inner diameter platform than the non-gas path side.

6. The vane according to claim 3, wherein the leading edge portion and the trailing edge portion of the axial feather seal slot has a gas path side and a non-gas path side and the gas path side is closer to an exterior surface of the inner diameter platform than the non-gas path side.

7. The vane according to claim 6, wherein the horizontal portion of the second feather seal is loaded against the non-gas path side of the trailing edge portion and a bend portion connects the horizontal portion and the vertical portion of the second feather seal.

8. The vane according to claim 7, wherein the bend portion does not make contact with the chamfer when the horizontal portion of the second feather seal is loaded against the non-gas path side of the trailing edge portion.

9. The vane according to claim 8, wherein the chamfer and the second feather seal are configured such that the bend portion does not make contact with edges of the chamfer.

10. The vane according to claim 1, wherein the chamfer is formed using electric discharge machining.

11. A vane assembly for a gas turbine engine, the vane assembly including: a first vane comprising an inner diameter platform and an outer diameter platform and an airfoil that extends between the inner diameter platform and the outer diameter platform, the airfoil having a leading edge, a trailing edge, a pressure side and a suction side, the inner diameter platform has a suction side mate face and a pressure side mate face, wherein the suction side mate face and the pressure side mate face of the inner diameter platform have an axial feather seal slot and a radial seal slot, the axial feather seal slot includes a leading edge portion that extends from the radial seal slot towards a leading edge of the inner diameter platform and a trailing edge portion that extends from the radial seal slot towards a trailing edge of the inner diameter platform, and a chamfer extends between the radial seal slot and the trailing edge portion of the axial feather seal slot; and     a second vane comprising an inner diameter platform and an outer diameter platform and an airfoil that extends between the inner diameter platform and the outer diameter platform, the airfoil having a leading edge, a trailing edge, a pressure side and a suction side, the inner diameter platform has a suction side mate face and a pressure side mate face, wherein the suction side mate face and the pressure side mate face of the inner diameter platform have an axial feather seal slot and a radial seal slot, the axial feather seal slot includes a leading edge portion that extends from the radial seal slot towards a leading edge of the inner diameter platform and a trailing edge portion that extends from the radial seal slot towards a trailing edge of the inner diameter platform, and a chamfer extends between the radial seal slot and the trailing edge portion of the axial feather seal slot;

wherein when the first vane and the second vane are adjacent to each other the axial feather seal slot and the radial seal slot of the inner diameter platform of the first vane and the second vane are adjacent to each other such that a first feather seal and a second feather seal can be located in the axial feather seal slot and the radial seal slot of the inner diameter platform of the first vane and the second vane.

12. The vane assembly according to claim 11, wherein the first feather seal includes a horizontal portion that is located in the leading edge portion of the axial feather seal slot and a vertical portion that is located in the radial seal slot when the first feather seal is located in the axial feather seal slot and the radial seal slot of the first vane and the second vane.

13. The vane assembly according to claim 12, wherein the second feather seal includes a horizontal portion that is located in the trailing edge portion of the axial feather seal slot and a vertical portion that is located in the radial seal slot when the second feather seal is located in the axial feather seal slot and the radial seal slot of the first vane and the second vane.

14. The vane assembly according to claim 11, wherein the second feather seal includes a horizontal portion that is located in the trailing edge portion of the axial feather seal slot and a vertical portion that is located in the radial seal slot when the second feather seal is located in the axial feather seal slot and the radial seal slot of the first vane and the second vane.

15. The vane assembly according to claim 11, wherein the leading edge portion and the trailing edge portion of the axial feather seal slot of the first vane and the second vane has a gas path side and a non-gas path side and the gas path side is closer to an exterior surface of the inner diameter platform of the first vane and the second vane than the non-gas path side.

16. The vane assembly according to claim 13, wherein the leading edge portion and the trailing edge portion of the axial feather seal slot of the first vane and the second vane are only located in the inner diameter platform and the leading edge portion and the trailing edge portion of the axial feather seal slot has a gas path side and a non-gas path side and the gas path side is closer to an exterior surface of the inner diameter platform of the first vane and the second vane than the non-gas path side.

17. The vane assembly according to claim 16, wherein the horizontal portion of the second feather seal is loaded against the non-gas path side of the trailing edge portion of the first vane and/or the second vane and a bend portion connects the horizontal portion and the vertical portion of the second feather seal.

18. The vane assembly according to claim 17, wherein the bend portion does not make contact with the chamfer of the first vane or the second vane when the horizontal portion of the second feather seal is loaded against the non-gas path side of the trailing edge portion of the first vane or the second vane.

19. A vane for a gas turbine engine, the vane including: an inner diameter platform and an outer diameter platform and an airfoil that extends between the inner diameter platform and the outer diameter platform, the airfoil having a leading edge, a trailing edge, a pressure side and a suction side, the inner diameter platform and the outer diameter platform each have a suction side mate face and a pressure side mate face, wherein the suction side mate face and the pressure side mate face of the inner diameter platform and the outer diameter platform have an axial feather seal slot and a radial seal slot, wherein the axial feather seal slot of the suction side mate face and the pressure side mate face of at least one of the inner diameter platform and the outer diameter platform includes a leading edge portion that extends from the radial seal slot towards a leading edge of the inner diameter platform and/or a leading edge of the outer diameter platform and a trailing edge portion that extends from the radial seal slot towards a trailing edge of the inner diameter platform and/or a trailing edge of the outer diameter platform, and a chamfer extends between the radial seal slot and the trailing edge portion of the axial feather seal slot.

\* \* \* \* \*